US008547909B1

(12) United States Patent
Yew et al.

(10) Patent No.: US 8,547,909 B1
(45) Date of Patent: Oct. 1, 2013

(54) METHOD AND SYSTEM FOR DYNAMIC ASSIGNMENT OF OVERHEAD CHANNEL GROUP

(75) Inventors: Meng Yew, Kansas City, MO (US); Hector Ribas, Overland Park, KS (US); John Humbert, Overland Park, KS (US); Abhijit Apte, Overland Park, KS (US); Ryan Talley, Olathe, KS (US); Michael Shafer, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 2151 days.

(21) Appl. No.: 10/789,860

(22) Filed: Feb. 27, 2004

(51) Int. Cl.
    *G06F 11/26* (2006.01)
(52) U.S. Cl.
    USPC ............................................ 370/329; 455/450
(58) Field of Classification Search
    USPC .................. 370/310, 320, 342, 441, 230, 235, 370/238, 328–329, 332, 431, 437, 463; 455/73, 455/560–561
    See application file for complete search history.

(56) References Cited

U.S. PATENT DOCUMENTS

| | | | |
|---|---|---|---|
| 5,513,379 A * | 4/1996 | Benveniste et al. ............ 455/451 |
| 5,715,526 A * | 2/1998 | Weaver et al. ................. 455/126 |
| 5,722,073 A * | 2/1998 | Wallstedt et al. .............. 455/437 |
| 5,752,161 A | 5/1998 | Jantti et al. |
| 5,777,990 A * | 7/1998 | Zehavi et al. .................. 370/335 |
| 5,864,547 A * | 1/1999 | Strodtbeck et al. ............ 370/318 |
| 5,978,368 A * | 11/1999 | Hjelm et al. ................... 370/347 |
| 6,069,883 A * | 5/2000 | Ejzak et al. .................... 370/335 |
| 6,073,032 A * | 6/2000 | Keskitalo et al. .............. 455/561 |
| 6,198,937 B1 * | 3/2001 | DeClerck et al. .............. 455/517 |
| 6,278,882 B1 * | 8/2001 | Choi ............................... 455/453 |
| 6,330,451 B1 * | 12/2001 | Sen et al. .................... 455/452.2 |
| 6,473,411 B1 * | 10/2002 | Kumaki et al. ................ 370/331 |
| 6,496,475 B1 * | 12/2002 | Ji et al. .......................... 370/216 |
| 6,625,134 B1 * | 9/2003 | Ji et al. .......................... 370/331 |
| 6,631,121 B1 * | 10/2003 | Yoon .............................. 370/329 |
| 6,671,265 B1 * | 12/2003 | Hwang et al. .................. 370/331 |
| 6,859,446 B1 * | 2/2005 | Gopalakrishnan et al. ... 370/335 |
| 6,950,416 B1 * | 9/2005 | Feuerstein et al. ............ 370/335 |
| 7,133,681 B1 * | 11/2006 | Talley et al. ................... 455/450 |
| 7,161,912 B1 * | 1/2007 | Dajer et al. .................... 370/328 |
| 2002/0146029 A1 * | 10/2002 | Kavak et al. ................... 370/441 |
| 2003/0108030 A1 * | 6/2003 | Gao ............................... 370/351 |
| 2005/0164742 A1 * | 7/2005 | Rajkotia ........................ 455/561 |

\* cited by examiner

*Primary Examiner* — Michael Thier
*Assistant Examiner* — Curtis A Alia

(57) ABSTRACT

Dynamic assignment of channel elements for operating as failover Overhead Channel Group channel elements. Preferred methods include configuring channel elements on a primary channel card to serve as an overhead channel group for each carrier in each sector, and, in the event of a primary channel card failure, dynamically configuring failover channel elements on an additional channel card to serve as an overhead channel group. These failover channel elements are preferably not reserved, and are merely channel elements that are not otherwise presently assigned to process traffic. Preferred methods also provide criteria for selecting which CEs to re-assign to the OCG.

16 Claims, 4 Drawing Sheets

METHOD AND SYSTEM FOR DYNAMIC ASSIGNMENT OF OVERHEAD CHANNEL GROUP

BACKGROUND

A. Field of Invention

The present invention is related to wireless communication systems, and more particularly, to a method and system of managing channel elements used for overhead channel group functions in a wireless base station.

B. Description of Related Art

In a typical wireless communication system, an area is divided geographically into a number of cell sites, each defined by one or more radiation patterns created by an emission of radio frequency (RF) electromagnetic (EM) waves from a respective base transceiver station (BTS) antenna. Similarly, BTS antennae are configured for the reception of EM waves emanating from mobile devices. Each cell site is typically further divided into two, three, or more sectors, where the sectors provide transmit and receive radio coverage for a selected area within the cell site.

Associated with the BTS is a plurality of channel elements for processing individual signal channels. Specifically, in CDMA communication systems, individual communication channels are separable due to their use of channel-specific concatenated coding sequences. In the forward channel, a unique PN code (commonly referred to as a short PN code offset) is used to distinguish channels in a given sector from those in surrounding sectors and cells. Within each sector, channels are further distinguished by yet another code, termed a Walsh code. In an adjacent sector, the Walsh codes may be reused because channel separation is provided by a different offset of the short PN code for that sector. In the ANSI/TIA/EIA-95-B-99 standard entitled "Mobile Station-Base Station Compatibility Standard for Wideband Spread Spectrum Cellular Systems" (published Feb. 1, 1999), the contents of which are incorporated by reference herein, there are sixty-four available Walsh codes, while in CDMA 2000 series (TIA/EIA IS-2000 Series, Rev. A, published Mar. 1, 2000), one hundred twenty-eight Walsh codes are available. Both of the ANSI/TIA/EIA-95-B-99 and the TIA/EIA IS-2000 Series, Rev. A, standards are incorporated herein by reference, and are available from the Telecommunication Industry Association, 2500 Wilson Boulevard, Suite 300, Arlington, Va. 22201.

On the reverse channel, from the mobile to the BTS, a slightly different code concatenation is used. The Walsh codes are used to identify a data symbol alphabet, the short PN code is used for synchronization purposes, and the long code PN code is used to identify the individual mobile channel.

On both the forward and reverse links within each sector, channels referred to as the Overhead Channel Group (OCG) are used to facilitate the call setup process for each carrier frequency used in that sector. Each carrier frequency in the sector has an associated OCG. The OCG channels on each carrier of the forward link are (i) the paging channel, which is monitored by inactive mobiles in the sector, thereby allowing the base station to query, or page, the mobile, and (ii) the sync channel, which contains a data stream of system identification and parameter information used by mobiles to access the system. On the reverse link the OCG channels are one or more public access channels used by mobiles to transmit registration requests, call setup requests, page responses, and other signaling information. The public access channels are specific, predetermined offsets of the long PN code.

The signal processing on each of the forward and reverse traffic channels and, in particular, the channels of the OCG, is performed in channel elements (CE) of the BTS. Each BTS has a bank of CEs that are available for use, which typically reside on one or more channel cards within the BTS. CEs may perform the convolutional encoding, block interleaving, and application of the Walsh coding, and long and short coding as described above. Alternatively, the short code for the forward channel (which is unique to the sector), may be applied to the accumulated outputs of the CEs for that sector. Each CE is typically implemented as a transceiver having a transmit side and a receive side. Thus, for each carrier in a given sector, two CEs are capable of handling the OCG channels.

In existing systems, channel element cards are pooled across frequency carriers. Typically, three OCGs are provisioned on one channel element card in a given carrier (assuming a three sector site). In this configuration, an additional three redundant/failover OCGs (a total of six redundant CEs) need to be pre-configured statically on another card that does not have OCGs assigned to it yet. These redundant/failover OCGs will then be available to service the sector carriers that are served by the OCGs on the channel element card that goes out of service. Again, the remaining CEs on the channel element card that has the redundant OCGs may be used for traffic channels.

While system reliability is increased by provisioning three redundant OCGs, the static provisioning of six channel elements for redundancy is an inefficient allocation of system resources. These channel elements could be used to service customer traffic if dynamic assignment of OCG is implemented with this creation. Specifically, channel cards are relatively reliable, and failures are uncommon events.

Consequently, an OCG CE allocation and assignment process for fail-over redundancy that overcomes these and other limitations is desirable.

SUMMARY

A method of managing channel elements for use as overhead channel group elements of base transceiver stations is provided. Preferred methods include configuring channel elements on a primary channel card to serve as an overhead channel group for each carrier in each sector, and, in the event of a primary channel card failure, dynamically configuring failover channel elements on an additional channel card to serve as an overhead channel group. These failover channel elements are preferably not reserved, and are merely channel elements that are not otherwise presently assigned to process traffic.

In situations where the base transceiver station includes both second and third generation channel cards, the preferred method includes selecting the failover channel elements first from one of the second generation channel cards and then, if necessary, from available channel elements residing on third generation channel cards.

Typically, each of the failover channel elements are dynamically configured by providing at least one configuration parameter indicative of the particular OCG channel function assigned to the CE. This preferably includes the Walsh codes to use for the OCG function. Alternatively, the configuration parameter sent to each of the failover channel elements is simply indicative of whether the failover channel element should assume the function of either a paging channel or sync channel. In addition, the configuration parameter may be an indication of the sector that the CE will be serving. This may be in the form of the forward channel short PN code offset to use, or it may simply take the form of an address or port location so that the CE output is provided to the correct BTS accumulator.

If an insufficient number of channel elements are available (i.e., the sector is in a blocking condition) the dynamic configuration of failover channel elements includes terminating calls to make additional channel elements available in order to obtain a sufficient number of unassigned channel elements to serve as failover channel elements. For a site in blocking condition, drop the traffic on the Channel Elements required for the OCG's, based on the priority of 2G channel cards first, if available, and a priority to drop the traffic. One preferred set of prioritization criteria to drop the traffic is:

1. calls that are in setup
2. calls with highest Forward Frame Error Rate (FFER)
3. calls that require highest BTS Transmit Power These as well as other features and advantages of the present invention will become apparent to those of ordinary skill in the art by reading the following detailed description, with appropriate reference to the accompanying drawings.

BRIEF DESCRIPTION OF FIGURES

Reference is made to the attached drawings, wherein elements that have the same reference numeral designations represent like elements throughout and wherein.

DETAILED DESCRIPTION OF EXEMPLARY EMBODIMENTS

A. Wireless Communication System

Figure 1:
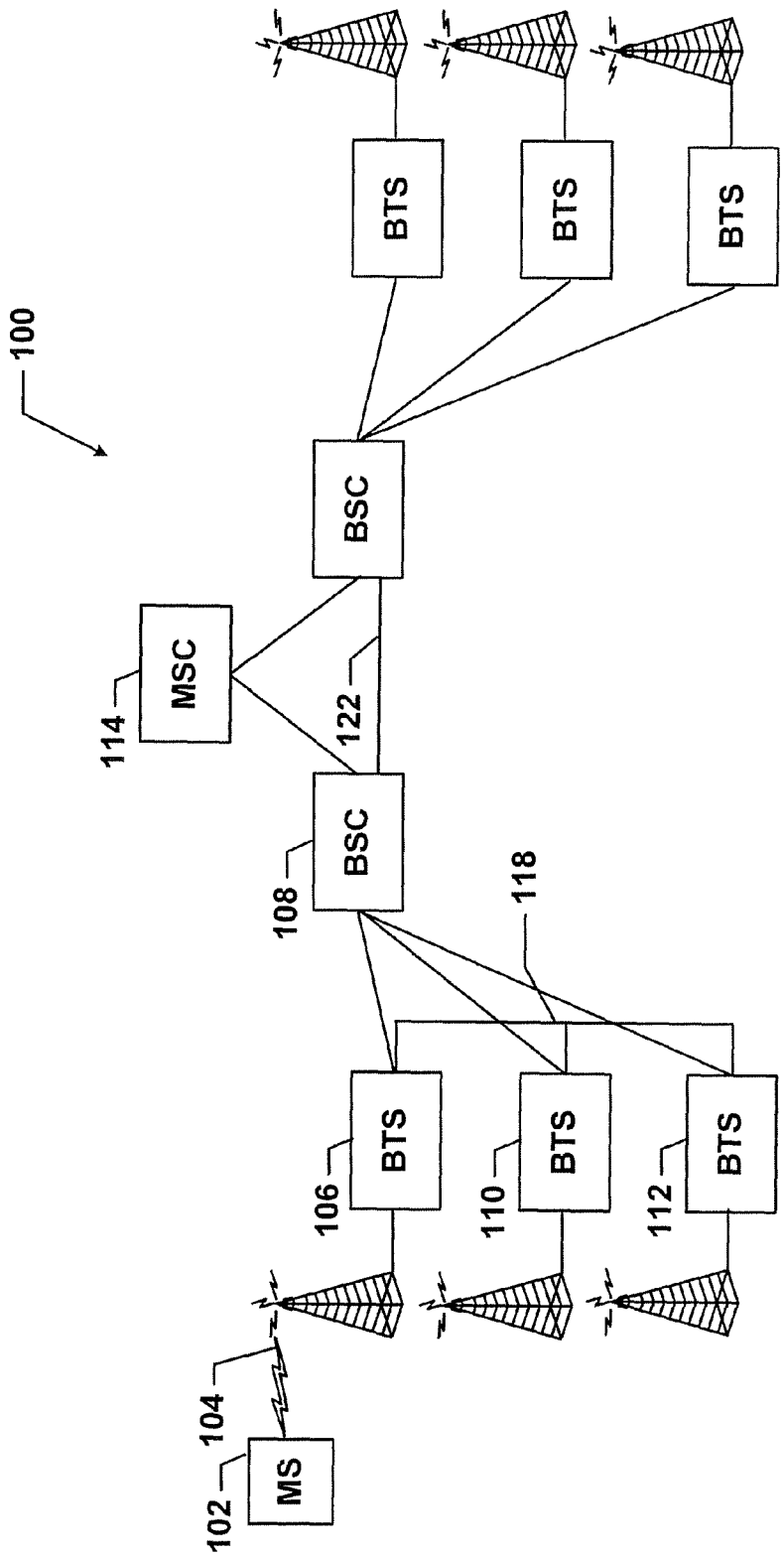
FIG. 1 is a block diagram illustrating one embodiment of a wireless communication system.

In accordance with an exemplary embodiment, a method and system of allocating channel elements for overhead channel groups for use within a wireless communication system is provided. Referring to FIG. 1, a block diagram illustrating one embodiment of a wireless communication system 100 is provided. It should be understood that this and other arrangements described herein are set forth for purposes of example only, and other arrangements and elements can be used instead and some elements may be omitted altogether. Further, as in most telecommunications applications, those skilled in the art will appreciate that many of the elements described herein are functional entities that may be implemented as hardware, firmware and/or software, and as discrete components or in conjunction with other components, in any suitable combination and location.

By way of example, the wireless communication system 100 is shown to include a mobile station (MS) 102 in communication via an air interface 104 with a base transceiver station (BTS) 106, which is coupled to a base station controller (BSC) 108. The BSC 108 is also coupled to a network 114. Mobile stations such as cellular telephones, personal digital assistants (PDA), wireless modems, or other mobile nodes may be used in the wireless communication system 100.

BTS 106 includes one or more antennas arranged to produce radiation patterns defining one or more sectors. Additional BTSs 110 and 112 coupled to BSC 108 are also illustrated. Although three BTSs for each BSC are illustrated within FIG. 1, it will be understood that more or fewer BTSs may be present within the wireless communication system 100.

BSC 108 is an interface between BTSs 106, 110, and 112 and the network 114. BSC 108 also handles radio resource management and radio network management functions for BTSs 106, 110, and 112. The network 114 may be any transport network and/or entity used to route signals to and from the MS 102. For example, network 114 may comprise a mobile switching center (MSC), a packet data service node (PDSN), an Internet protocol (IP) network, the public switched telephone network (PSTN), or any other wireless communication transport network. In addition, network 114 may allow for connectivity to multiple switching platforms, such as a short message service center (SMSC) and an uplink server, for example.

Each of the couplings of the wireless communication system 100, excluding the air interface 104, may be interfaces using various physical, media access, and data link layer technologies, including such technologies as TDM trunks (e.g., trunk level 1 (T1) line), a packetbased link (e.g, IEEE 802.3, gigabit Ethernet line), or other connections.

The wireless communication system 100 may be divided geographically into a number of cell sites. At the core of each cell site is a BTS, such as BTSs 106, 110, and 112, whose antennas define a radio frequency (RF) radiation pattern. Further, each cell site may be divided into a number of sectors, each defined respectively by radiation patterns from directional antenna elements of the cell site's BTS. Each sector typically has a beam width of about 120 degrees. However, sectors can have any desired beam width.

The radiation pattern of each sector in a cell site produces an air interface that defines a respective coverage area, such as air interface 104. When an MS is positioned within such a coverage area, the air interface provides a communication path between the MS and the BTS. And the MS can then communicate through this path with entities on the wireless communication system 100.

In a typical CDMA wireless communication network, a subscriber connects to the base station and the network infrastructure by way of two separate wireless channels—one from the BTS to the MS, typically referred to as the forward channel, and one from the MS to the BTS, or the reverse channel. The signal processing associated with these communication channels is provided by channel elements (CEs).

The forward and reverse channels have different formats and utilize different physical and link layer signaling. Each channel in a CDMA system is identified by a number of parameters, including the frequency of the RF carrier, and various PN sequences that are sequentially applied to the data.

In particular, the forward channel uses a long PN code sequence to scramble the data, and a short PN code with a time offset that defines the sector. That is, all forward channels in a given sector use the same PN short code with the same offset. Other sectors may utilize the same short PN code, but with a different offset. In addition, each forward channel in a sector uses a specific PN Walsh code to identify data for a given user. The orthogonality of the Walsh codes separates the user channels within a given sector. In IS 95, there are sixty-four Walsh codes—one is used as a pilot, one (or from one to seven) is used for paging, and one is used for sync, leaving as many as sixty-one Walsh codes for sixty-one forward channels per sector. IN CDMA 2000, 128 Walsh codes are available. In either system, adjacent sectors may use the same set of Walsh codes due to the use of different short PN code offsets in those sectors.

For the reverse channel, the various PN codes are used in a different manner. First, each MS uses the Walsh codes as a symbol alphabet, whereby up to six data bits may be combined and represented by a single Walsh code. The short code is then applied, and is used for synchronization purposes. Finally, the individual user channels are identified by the offset of the long code. More particularly, the specific long code used to identify the MS's channel is made by "masking" the PN long code by a number determined mathematically by the handset's ESN. With over forty days of 1,228,800 chips/second to choose from, there are billions and billions of reverse traffic channels possible. Of course, reverse access channels are associated with each paging channel in the forward direction, which are publicly-defined long code offsets reserved for reverse-direction public traffic such as call originations, registrations, etc. After a BTS recognizes an MS on an access channel, its identity is known and the BTS redirects the MS to a traffic channel where it will use its own natural long code.

Figure 2:
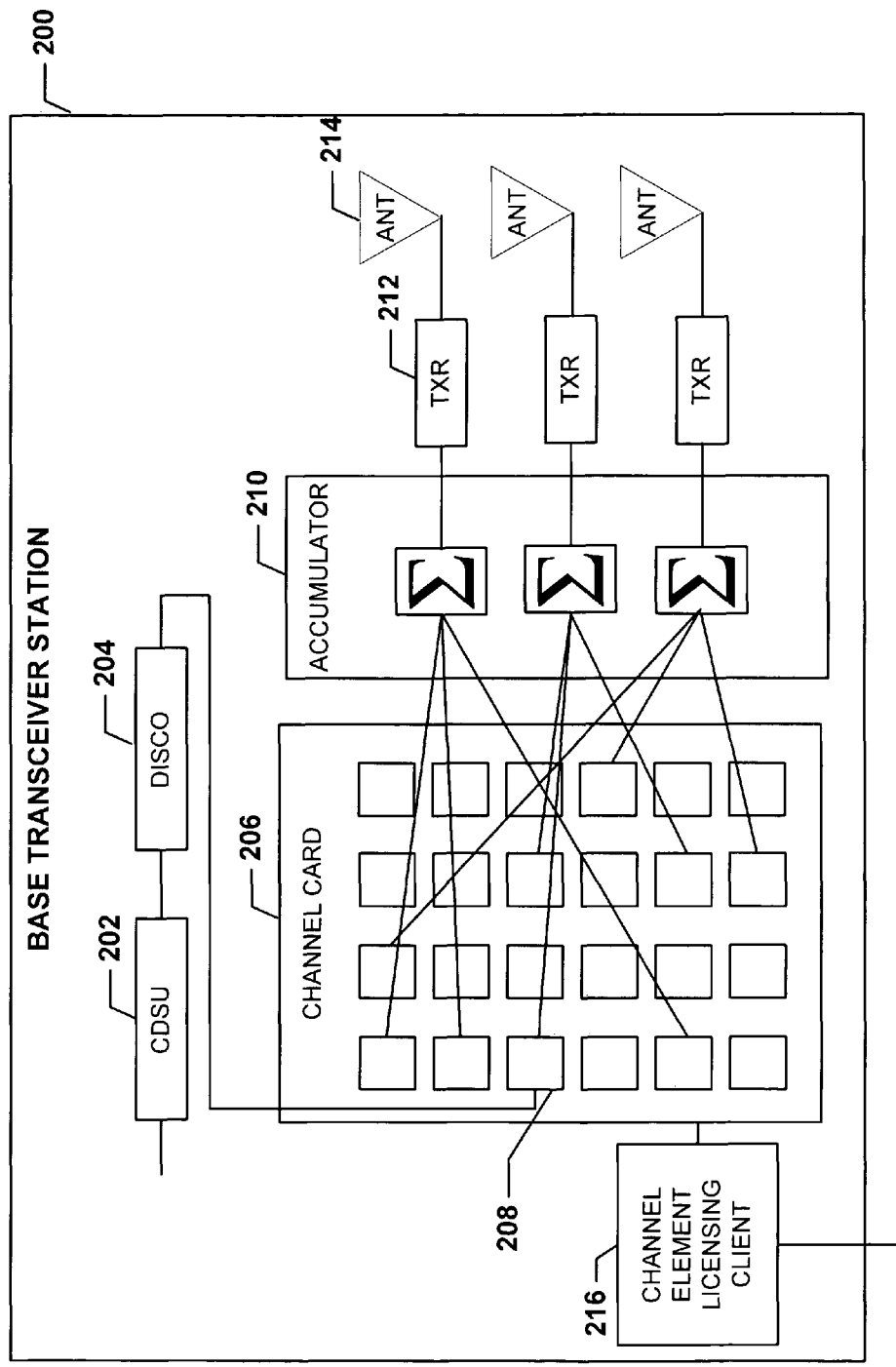
FIG. 2 illustrates a typical BTS architecture.

A typical BTS 200 architecture is shown in FIG. 2. The BTS includes a channel/data service unit CDSU 202 and a DISCO 204. The CDSU provides a communication interface for routing signals from a TDM network (e.g., a T-1 line) to the BTS. The DISCO 204 (DIStribution and COnsolidation unit) provides the communications path and the routing for data packets between various BSC subsystems and the BTSs, and typically routes traffic packets between SBS (soft base station) and BTS subsystems, such as routing the packets to the appropriate CE 208 on the channel element card 206. The outputs of the CEs are summed in accumulator 210, and provided to a corresponding BTS RF transceiver 212 and RF antenna 214. As shown in FIG. 2, the CEs may be assigned to any channel on one of the available sectors and frequencies provided by the BTS.

The system described herein provides for automatic provisioning of CEs to act as failover OCGs. That is, when the channel elements providing the primary OCG channels fail, backup CEs are provisioned to take over the OCG functions. A preferred method 300 of assigning channel elements to the Overhead Channel Group at a base transceiver station is set forth in FIG. 3A. At step 302 the failure of the primary OCG is detected. The detection is preferably performed by a system manager module within the BTS. The system manager may detect individual CE failures, or channel card failures.

At step 304, the BTS provisions CEs to act as failover OCG CEs (i.e., CEs that take over the functions of the failed OCG CEs). In the event that unassigned CEs are readily available for provisioning, the BTS system manager selects the failover OCG CEs. If, however, an insufficient number of CEs are available, then the step of provisioning the failover CEs proceeds according to FIG. 3B.

Figures 3A, 3B:
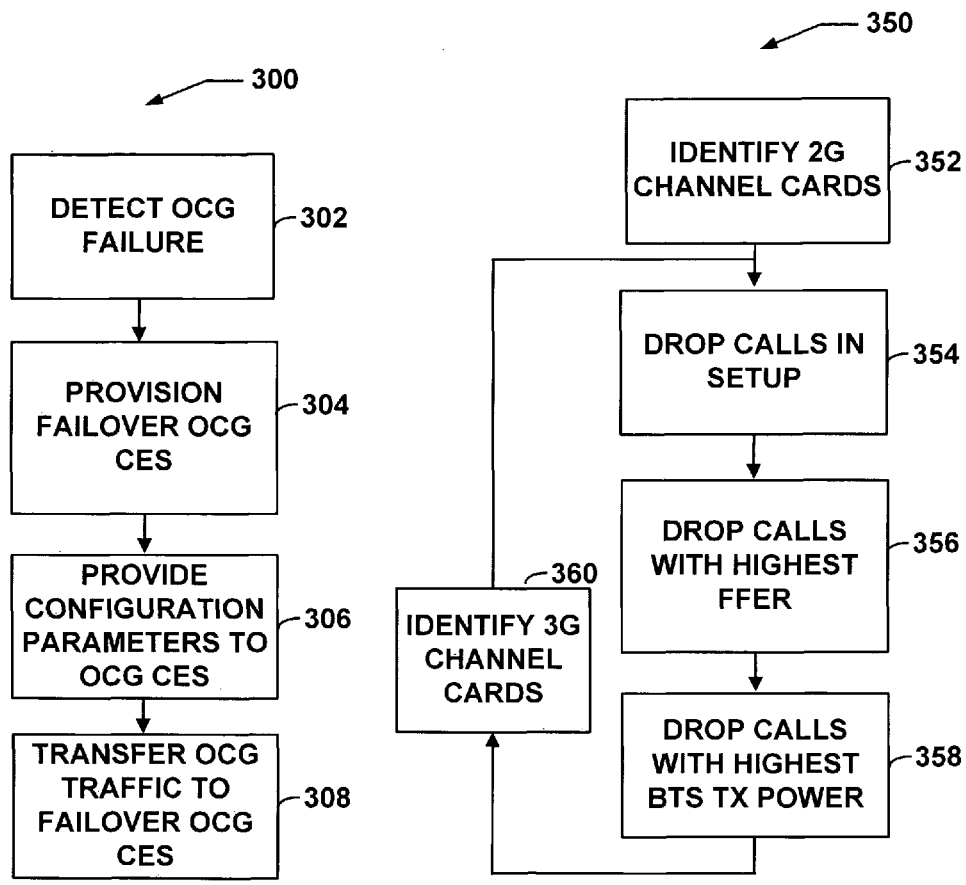
FIGS. 3A and 3B illustrate methods of overhead channel group assignment and provisioning.
Figure 4A:
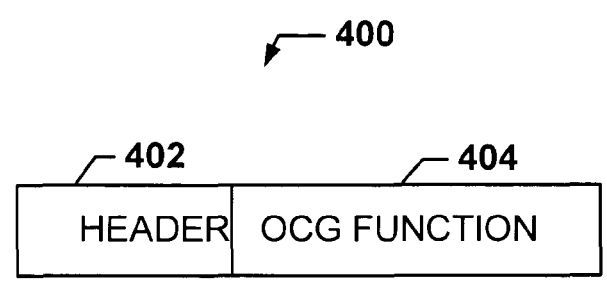
FIGS. 4A and 4B are preferred embodiments of a failover OCG channel element configuration message.
Figure 4B:
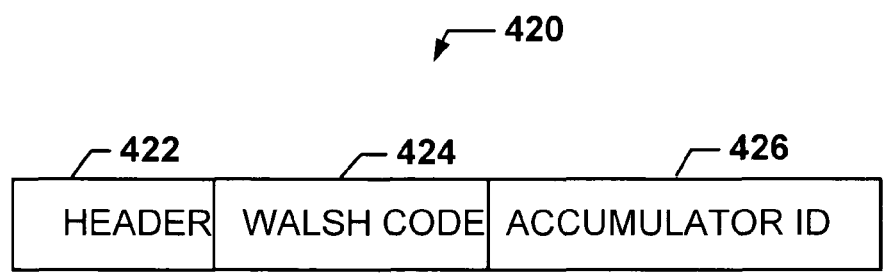

As shown in FIG. 3B, the BTS must identify CEs to act as failover OCG CEs. Method 350 depicts the steps by which CEs are selectively de-assigned from other responsibilities so that they will then be available for OCG failover assignment and configuration. Once the BTS has a sufficient number of CEs to act as the failover OCG CEs, the method 350 is halted, and the process returns to the configuration step of 306 of FIG. 3A. CEs are first selected from 2G channel element cards as shown in step 352. On the 2G cards, CEs assigned to calls that are still in the setup mode (i.e., voice or data traffic has not yet been established) are identified, and those calls are dropped (step 354). If sufficient CEs are not yet available, CEs supporting calls having a high forward frame error rate (FFER) are dropped at step 356. Preferably a FFER threshold is selected, and calls with the FFER above the threshold are dropped. Next, calls requiring a high BTS transmit power level are dropped at step 358. Again, a threshold for the power level may be provided to determine which calls should be dropped. If sufficient CEs are still not available, then the same procedure is performed for the 3G channel cards, as shown by step 360, which feeds back into steps 354, 356, and 358.

Referring back to FIG. 3A, after the failover OCG CEs are provisioned, the BTS provides them with the necessary configuration parameters at step 306. Preferably, the BTS system manager sends a channel element configuration message 400 or 420. In configuration message 400, the CE is informed of what OCG function is assigned to it by configuration parameter 404. In an alternative embodiment, the channel element configuration message 420 may inform the failover OCG CE which Walsh code to use when encoding the data provided to it. As described above, each OCG channel has a specific predetermined Walsh code. Thus, the CE may only need to know which Walsh code to use. The configuration message 420 includes a Walsh code ID 424. In some embodiments, the CE may need to know which accumulator to send its output to. The CE configuration message 420 includes an accumulator ID 426.

Depending on the nature of the intercommunication between the CEs and the accumulator, the accumulator ID parameter may take many forms. For example, where the CEs have separate physical ports for communicating with each accumulator, the failover CE would need to know which CE output port to transmit its signal to. In embodiments where the CE and accumulators are on a high speed packet bus, the failover CEs may be configured with the address of the appropriate accumulator. These are representative configuration parameters, and the choice of which parameter is to be used is a design variable that may be selected based on the preferred hardware configuration. Once the failover OCG CEs are provisioned and appropriately configured, the OCG traffic is transferred to the failover CEs, as shown in step 308.

Those skilled in the art to which the present invention pertains may make modifications resulting in other embodiments employing principles of the present invention without departing from its spirit or characteristics. Accordingly, the described embodiments are to be considered in all respects only as illustrative, and not restrictive, and the scope of the present invention is, therefore, indicated by the appended claims rather than by the foregoing description. Consequently, while the present invention has been described with reference to particular embodiments, modifications apparent to those skilled in the art would still fall within the scope of the invention.

We claim:

1. A method of allocating channel elements for use as an overhead channel group in a base station serving a plurality of sectors, comprising the steps of:

detecting a failure of a primary channel card on which channel elements are configured for an overhead channel group of a given sector:

in response to detecting the failure, identifying an additional channel card on which to configure failover channel elements for the overhead channel group;

determining that there is an insufficient number of unassigned channel elements available on the additional channel card to serve as the failover channel elements for the overhead channel group;

in response to determining that there is an insufficient number of unassigned channel elements available on the additional channel card, (a) identifying each channel element on the additional channel card that is assigned to a call in a call setup phase and (b) terminating each call on the additional channel card that is in a call setup phase to make available each identified channel element assigned to a call in a call setup phase; and dynamically configuring at least one identified channel element previously assigned to a call in a call setup phase to serve as at least one of the failover channel elements for the overhead channel group.

2. The method of claim 1, wherein identifying the additional channel card comprises selecting a second generation channel card over a third generation channel card.

3. The method of claim 1 wherein dynamically configuring the at least one identified channel element to serve as the failover channel element comprises providing the at least one identified channel element with at least one configuration parameter indicative of a sector to serve.

4. The method of claim 1 wherein dynamically configuring the at least one identified channel element to serve as the failover channel element comprises providing the at least one identified channel element with at least one configuration parameter indicative of one of a paging channel function and sync channel function to be performed.

5. The method of claim 1 wherein dynamically configuring the at least one identified channel element to serve as the failover channel element comprises providing the at least one identified channel element with at least one configuration parameter indicative of a particular overhead channel group function to be performed.

6. The method of claim 1 wherein dynamically configuring the at least one identified channel element to serve as the failover channel element comprises providing the at least one identified channel element with one or more Walsh codes.

7. The method of claim 1 wherein dynamically configuring the at least one identified channel element to serve as the failover channel element comprises providing the at least one identified channel element with an accumulator identifier.

8. The method of claim 1 further comprising:
after terminating each call on the additional channel card that is in a call setup phase, determining that there is still an insufficient number of unassigned channel elements available on the additional channel card;

in response to determining that there is still an insufficient number of unassigned channel elements available on the additional channel card, (a) identifying each channel element on the additional channel card that is assigned to a call with a forward frame error rate (FFER) above a FFER threshold and (b) terminating each call on the additional channel card with a FFER above the FFER threshold to make available each identified channel element assigned to a call with a FFER above the FFER threshold; and dynamically configuring at least one identified channel element previously assigned to a call with a FFER above the FFER threshold to serve as at least one of the failover channel elements for the overhead channel group.

9. The method of claim 1 further comprising:
after terminating each call on the additional channel card that is in a call setup phase, determining that there is still an insufficient number of unassigned channel elements on the additional channel card;

in response to determining that there is still an insufficient number of unassigned channel elements on the additional channel card, (a) identifying each channel element on the additional channel card that is assigned to a call requiring a base-station transmit power above a power threshold and (b) terminating each call on the additional channel card requiring a base-station transmit power above the power threshold to make available each identified channel element assigned to a call requiring a base-station transmit power above the power threshold; and dynamically configuring at least one identified channel element previously assigned to a call requiring a base-station transmit power above the power threshold to serve as at least one of the failover channel elements for the overhead channel group.

10. The method of claim 1 further comprising:
after terminating each call on the additional channel card that is in a call setup phase, determining that there is still an insufficient number of unassigned channel elements on the additional channel card;

in response to determining that there is still an insufficient number of unassigned channel elements on the additional channel card, identifying a second additional channel card on which to configure the failover channel elements for the overhead channel group; and dynamically configuring at least one channel element on the second additional channel card to serve as at least one of the failover channel elements for the overhead channel group.

11. The method of claim 10 wherein identifying the additional channel card comprises selecting a second generation channel card over a third generation channel card, and wherein identifying the second additional channel card comprises selecting the third generation channel card over the second generation channel card.

12. A base station comprising:
one or more antennas arranged to produce radiation patterns defining one or more sectors;

a plurality of channel cards that each include a plurality of channel elements; and a controller arranged to:
detect a failure of the primary channel card on which channel elements are configured for an overhead channel group of a given sector;

in response to detecting the failure, identify an additional channel card on which to configure failover channel elements for the overhead channel group;

determine that there is an insufficient number of unassigned channel elements available on the additional channel card to serve as the failover channel elements for the overhead channel group;

in response to determining that there is an insufficient number of unassigned channel elements available on the additional channel card, (a) identify each channel element on the additional channel card that is assigned to a call in a call setup phase and (b) terminate each call on the additional channel card that is in a call setup phase to make available each identified channel element assigned to a call in a call setup phase; and dynamically configure at least one identified channel element previously assigned to a call in a call setup phase to serve as at least one of the failover channel elements for the overhead channel group.

13. The base station of claim 12, wherein the controller is further configured to:
identify each channel element on the additional channel card that is assigned to a call with a forward frame error rate (FFER) above a FFER threshold;

terminate each call on the additional channel card with a FFER above the FFER threshold to make available each identified channel element with a FFER above the FFER threshold; and dynamically configure at least one identified channel element previously assigned to a call with a FFER above the FFER threshold to serve as at least one of the failover channel elements for the overhead channel group.

14. The base station of claim 12, wherein the controller is further configured to:
   identify each channel element on the additional channel card that is assigned to a call requiring a base-station transmit power above a power threshold;
   terminate each call on the additional channel card requiring a base-station transmit power above the power threshold to make available each identified channel element requiring a base-station transmit power above the power threshold; and
   dynamically configure at least one identified channel element previously assigned to a call requiring a base-station transmit power above the power threshold to serve as at least one of the failover channel elements for the overhead channel group.

15. The base station of claim 12, wherein the controller is further configured to:
   identify a second additional channel card on which to configure the failover channel elements for the overhead channel group;
   dynamically configure at least one channel element on the second additional channel card to serve as at least one of the failover channel elements for the overhead channel group.

16. A method of allocating channel elements for use as an overhead channel group in a base station serving a plurality of sectors, comprising the steps of:
   detecting a failure of a primary channel card on which channel elements are configured for an overhead channel group of a given sector;
   in response to detecting the failure, identifying an additional channel card on which to configure failover channel elements for the overhead channel group;
   determining that there is an insufficient number of unassigned channel elements available on the additional channel card to serve as the failover channel elements for the overhead channel group;
   in response to determining that there is an insufficient number of unassigned channel elements available on the additional channel card, terminating any call on the additional channel card that is in a call setup phase to make available any channel element on the additional channel card that is assigned to a call in a call setup phase;
   if there is still an insufficient number of unassigned channel elements available on the additional channel card after terminating any call that is in a call setup phase, terminating any call on the additional channel card with a forward frame error rate (FFER) above a FFER threshold to make available any channel element on the additional channel card that is assigned to a call with a FFER above the FFER threshold;
   if there is still an insufficient number of unassigned channel elements on the additional channel card after terminating any call with a FFER above the FFER threshold, terminating any call on the additional channel card requiring a base-station transmit power above a power threshold to make available any channel element on the additional channel card that is assigned to a call requiring a base-station transmit power above the power threshold; and
   dynamically configuring a sufficient number of unassigned channel elements on the additional channel card to serve as at least one of the failover channel elements for the overhead channel group.

* * * * *